United States Patent [19]
Ohta

[11] Patent Number: 5,166,955
[45] Date of Patent: Nov. 24, 1992

[54] SIGNAL DETECTION APPARATUS FOR DETECTING DIGITAL INFORMATION FROM A PCM SIGNAL

[75] Inventor: Haruo Ohta, Yawata, Japan

[73] Assignee: Matsushita Electric Industrial Co., Ltd., Osaka, Japan

[21] Appl. No.: 617,884

[22] Filed: Nov. 26, 1990

[30] Foreign Application Priority Data

Nov. 27, 1989 [JP] Japan .................. 1-307042

[51] Int. Cl.⁵ ........................... H04L 27/01
[52] U.S. Cl. ....................... 375/11; 360/51; 360/65; 375/18; 375/20; 375/101; 375/120
[58] Field of Search ........ 375/11, 12, 14, 18, 375/20, 101, 110, 120, 17; 360/39, 45, 51, 65

[56] References Cited

U.S. PATENT DOCUMENTS

| | | | |
|---|---|---|---|
| 3,760,111 | 9/1973 | Sawi | 375/11 |
| 3,872,381 | 3/1975 | Yamamoto et al. | 375/101 |
| 4,123,625 | 10/1978 | Chow | 375/18 |
| 4,247,940 | 1/1981 | Mueller et al. | 375/14 |
| 4,433,424 | 2/1984 | Taber et al. | 360/51 |
| 4,580,176 | 4/1986 | Graves et al. | 360/45 |
| 4,775,984 | 10/1988 | Jaffre et al. | 375/18 |
| 4,847,871 | 7/1989 | Matsushita et al. | 375/101 |

OTHER PUBLICATIONS

Performance Analysis of Partial Response Systems for Nonreturn-to-Zero Recording Hisashi Osawa et al., IEEE Transactions On Magnetics, vol. Mag-22, No. 4, Jul. 1986, pp. 253-258.

An Experimental Study on Bit Rate Reduction & High Density Recording for a Home-Use Digital VTR, IEEE Transactions on Consumer Electronics, vol. 34, No. 3, Aug. 1988, Chojuro Yamamitsu, et al., pp. 588-596.

Application of Probabilistic Decoding to Digital Magnetic Recording Systems, IBM J. Res. Develop., H. Kobayashi, Jan. 1971, pp. 64-74.

*Primary Examiner*—Benedict V. Safourek
*Attorney, Agent, or Firm*—Wenderoth, Lind & Ponack

[57] ABSTRACT

A signal detection apparatus detects digital information contained in a binary baseband PCM signal transmitted on a communication transmission channel or recorded on a recording medium. A first equalizer equalizes the PCM signal to reduce intersymbol interference. A clock reproducer reproduces a clock signal synchronized with the timing of the digital information using an output signal of the first equalizer. A second equalizer subjects the output signal of the first equalizer to partial response equalization. A decoding circuit decodes the digital information from an output signal of the second equalizer at a timing of the clock signal. A stable clock signal is easily reproduced and the digital information is detected at a lower bit error rate.

3 Claims, 6 Drawing Sheets

SIGNAL DETECTION APPARATUS FOR DETECTING DIGITAL INFORMATION FROM A PCM SIGNAL

BACKGROUND OF THE INVENTION:

1. Field of the Invention

The present invention relates to a signal detection apparatus for detecting original digital information contained in a binary baseband PCM (Pulse Code Modulation) signal transmitted through a communication transmission channel or reproduced from a recording medium.

2. Description of the Prior Art

For detecting signals contained in a binary baseband PCM signal transmitted through a transmission line or reproduced from a recording medium, a method is known in which the original digital signal is detected after partial equalization so as to produce a predetermined specific intersymbol interference (e.g. H. Osawa et al., "Performance Analysis of Partial Response System for Nonreturn-to-Zero Recording", IEEE Transactions on Magnetics, Vol. MAG-22, No. 4, July 1988). A method is also known in which Viterbi decoding, which is a type of maximum-likelihood decoding, is used for detecting the original digital information from a signal which has been subjected to partial response equalization (e.g. H. Kobayashi, "Application of Probablistic Decoding to Digital Magnetic Recording Systems", IBM Journal of Research and Development, Vol. 15, No. January 1971, pp. 64–74). These methods permit the detection of signals at a low bit error rate in comparison to a method in which the original digital information is detected by equalizing and suppressing the intersymbol interference in a channel having substantial intersymbol interference, such as in a magnetic recording channel.

An example in which the above-mentioned detection method as applied to the digital VCR (Video Cassette Recorder) is described in C. Yamamitsu et al., "An Experimental Study on Bit Rate Reduction and High Density Recording for a Home-use Digital VTR", IEEE Transactions on Consumer Electronics, Vol. 34, No. 3, August 1988, pp. 588–596. As described in this reference, a signal reproduced from a detection head and amplified by a detection head amplifier is subjected to partial response equalization in which the intersymbol interference is represented by (1, 0, −1). The polynominal expression of this equalization system is $1 - D^2$, where D denotes a delay of 1 sampling period. It is frequently called partial response Class-IV. The equalized signal is input to a Viterbi decoding circuit. The Viterbi decoding circuit is constituted by an AD converter and other logic circuits. Here, the signal subjected to partial response equalization becomes a 3-level eye pattern signal.

In order to detect the digital information, the clock signal synchronized with the timing of the digital information must be reproduced and supplied to the Viterbi decoding circuit and like components including the AD converter. The clock signal can be easily reproduced from the signal which, being equalized to have no intersymbol interference, exhibits 2-level eye patterns in the normal PLL (Phase Locked Loop) circuit equipped with a phase comparator for comparing a phase of the signal exhibiting 2-level eye patterns at a zero-cross point thereof with a reference clock phase. However, according to the above-mentioned configuration, a problem arises in that, since the signal after equalization exhibits 3-level eye patterns, reproduction of the clock signal is rendered difficult, and as a result, the reproduced clock signal is apt to become unstable.

Further, in the above-mentioned configuration, the partial response equalization must be realized by analog processing. However, realization of an accurate equalization characteristic using analog processing is difficult. Thus, an additional problem arises in that, when the equalization characteristic is not accurate, the bit error rate increases even if Viterbi decoding is carried out.

SUMMARY OF THE INVENTION

An object of the present invention is to provide a signal detection apparatus for detecting digital information contained in a binary baseband PCM signal from a transmission channel or a recording medium in which a stable clock signal can be easily reproduced and subjected to partial response equalization.

Another object of the present invention is to provide a signal detection apparatus which can easily reproduce a stable clock signal and accurately carry out partial response equalization, and which can detect the digital information at a lower bit error rate.

A further object of the present invention is to provide a signal detection apparatus which can easily reproduce a stable clock signal and accurately carry out partial response equalization, and which can further detect the digital information at an even lower bit error rate using Viterbi decoding.

In order to attain the above-mentioned objects, a signal detecting apparatus of the present invention comprises a first equalization means for equalizing a binary baseband PCM signal transmitted through a transmission channel or reproduced from a recording medium so as to reduce intersymbol interference, a clock reproducing means for reproducing a clock signal contained in an output signal of the first equalization means, a second equalization means for subjecting the output signal of the first equalization means to partial response equalization, and a decoding means for decoding digital information from an output signal of the second equalization means at a timing of the reproduced clock signal. The clock reproducing means comprises a phase locked loop circuit having a phase comparator for comparing a phase of the output of the first equalization means at a zero-cross point thereof with a reference clock phase.

According to the above configuration of the present invention, the binary baseband PCM signal transmitted through a transmission channel or reproduced from a recording medium is once equalized so as to be free from intersymbol interference to facilitate reproduction of a stable clock signal. Moreover, using the partial response equalization, the digital information signal can be detected at a low bit error rate.

Further, preferably, the present invention includes a configuration comprising a first equalization means for equalizing a binary baseband PCM signal transmitted through a transmission channel or reproduced from a recording medium, a clock reproducing means for reproducing a clock signal from an output signal of the first equalization means, an AD (analog-to-digital) conversion means for sampling and quantizing the output signal of the first equalization means at a timing of the reproduced clock signal, a digital equalization means for subjecting an output signal of the AD conversion means to partial response equalization in the form of a digital signal, and a Viterbi decoding means for decoding digital information contained in an output signal of the digital equalization means. The clock reproducing means comprises a phase locked loop circuit having a phase comparator for comparing a phase of the output of the first equalization means at a zero-cross point thereof with a reference clock phase.

By the above configuration, due to the partial response equalization by digital processing, an accurate equalization characteristic can be realized, and further, due to the maximum-likelihood decoding by Viterbi decoding, the digital information can be detected at an even lower bit error rate.

DESCRIPTION OF THE PREFERRED EMBODIMENTS

Figure 1:
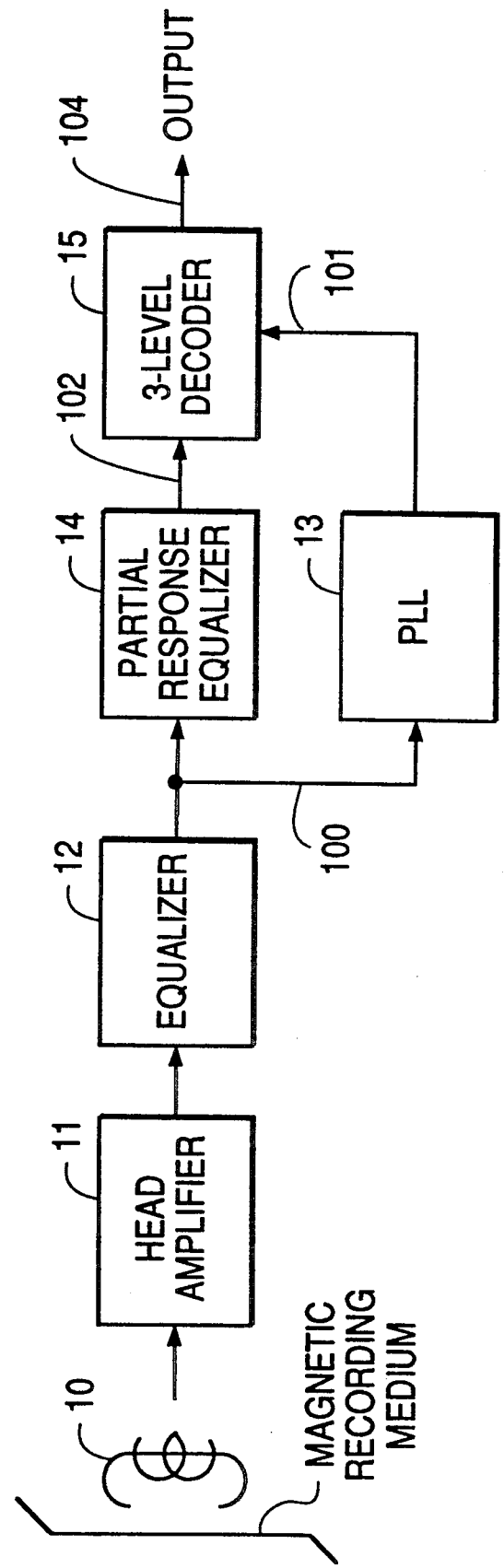
FIG. 1 is a block diagram of a first embodiment of a signal detection apparatus of the present invention.

FIG. 1 is a block diagram of the first embodiment in which a signal detection apparatus of the present invention is applied to a magnetic recording and reproducing apparatus. In FIG. 1, a binary baseband PCM signal recorded on a recording medium is reproduced by a magnetic head 10. The reproduced signal is amplified to a necessary amplitude by a head amplifier 11.

Figure 2A:
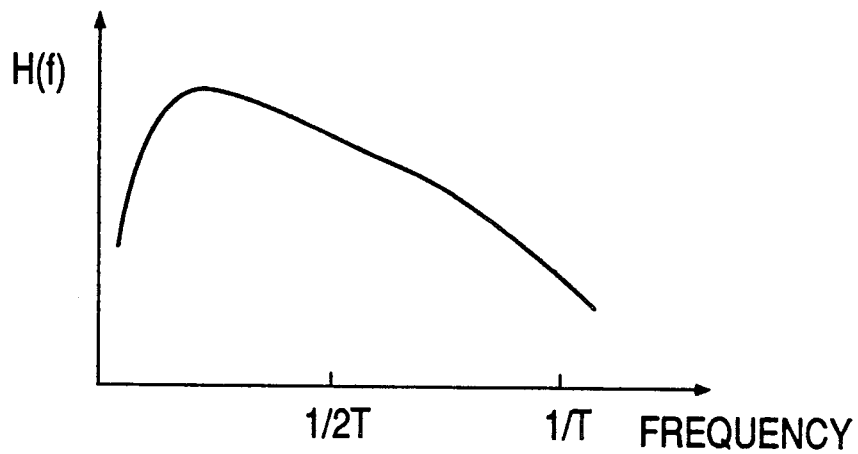
FIGS. 2(a)-(c) are frequency characteristic diagrams of an equalizer in the first embodiment.
Figure 2B:
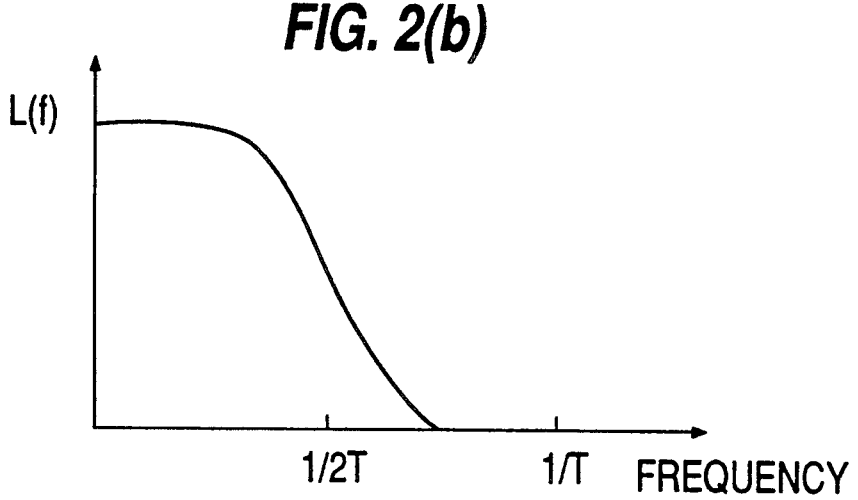

An equalizer 12 equalizes the reproduced signal to suppress the intersymbol interference obtained during the recording and reproducing process. The frequency characteristic of the system from a recording system to the head amplifier 11 is H(f) as shown in FIG. 2(a), and the frequency characteristic satisfying the Nyquist criterion is L(f) as shown in FIG. 2(b). Here, denoting the data sampling period as "T" and the roll-off factor as "a", L(f) is expressed by the following equation:

$$L(f) = \begin{cases} T & \text{when } 0 \leq f \leq \frac{1-a}{2T} \\ \frac{T}{2}\left\{1 - \sin\left[\frac{\pi}{2a}(2fT-1)\right]\right\} & \text{when } \frac{1-a}{2T} \leq f \leq \frac{1+a}{2T} \\ 0 & \text{when } \frac{1+a}{2T} \leq f \end{cases}$$

Figure 2C:
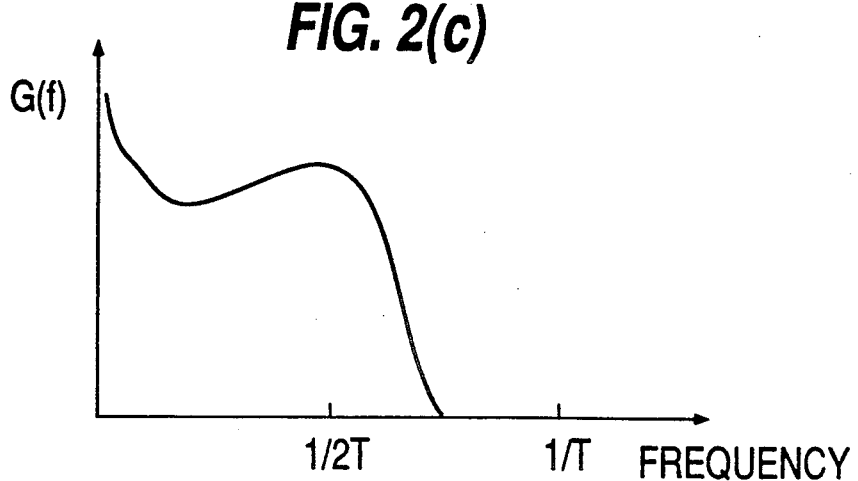

At this time, assuming the frequency characteristic of the equalizer 12 to be G(f), then G(f)=L(f)/H(f) as shown in FIG. 2(c).

Figure 3:
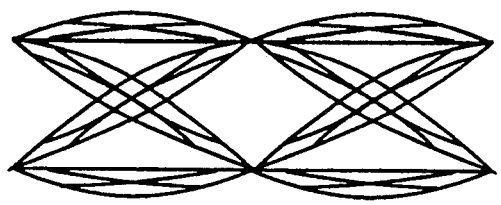
FIG. 3 depicts a 2-level eye pattern for explaining an operation of the first embodiment.

Referring again to FIG. 1, a signal 100 output from the equalizer 12 can be expressed by the 2-level eye pattern shown in FIG. 3. From the signal 100, a clock signal 101 synchronized with the digital information is obtained by a PLL (Phase Locked Loop) circuit 13 equipped with a phase comparator for comparing a phase of the signal 100 at a zero cross point thereof with a reference clock phase.

Figure 5:
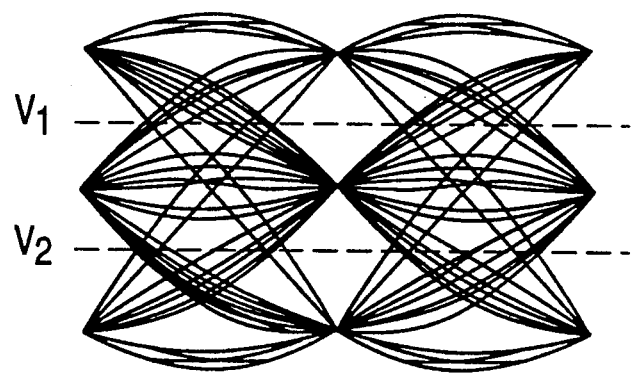
FIG. 5 depicts a 3-level eye pattern for explaining an operation of the first embodiment.
Figure 4:
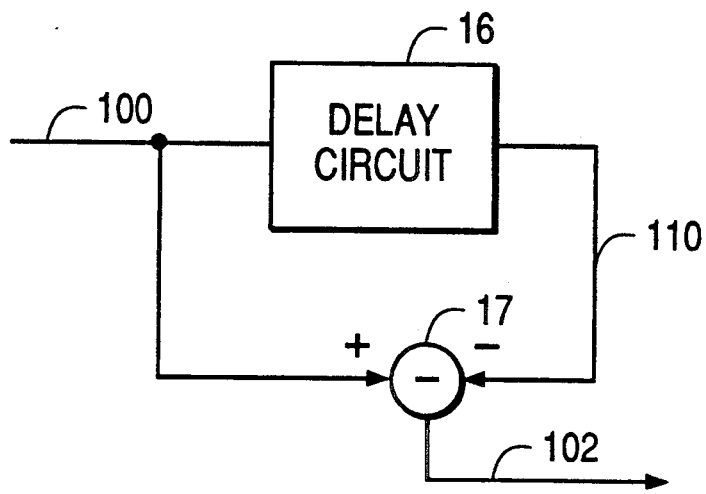
FIG. 4 is a block diagram of a partial response equalizer in the first embodiment.

On the other hand, the signal 100 is also input to a partial response equalizer 14. A configuration of the partial response equalizer 14 is shown in FIG. 4. The signal 100 is input to a delay circuit 16 to obtain a signal 110 which is delayed by 2T (T is a sampling period of the data). A subtraction circuit 17 subtracts the signal 110 from the signal 100 to obtain a signal 102. As a result, the signal 102 is equalized so that the intersymbol interference becomes (1, 0, −1). Thus, the signal 102 can be expressed by the 3-level eye pattern shown in FIG. 5.

This equalization is expressed by a polynominal expression 1−D², where D denotes delay of one data transfer cycle. It is also frequently called a partial response Class-IV.

Referring again to FIG. 1, the signal 102 is decoded by a 3-level decoder 15 into the original digital information, which is output as a signal 104.

Figure 6:
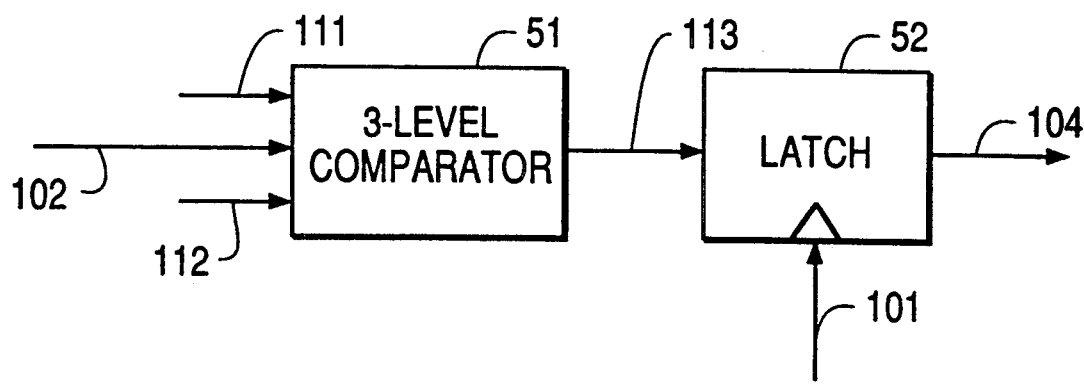
FIG. 6 is a block diagram of a 3-level decoder in the first embodiment.

The 3-level decoder 15 may be configured as shown in FIG. 6. The signal 102 is input to a 3-level comparator 51. To the comparator 51, a signal 111 having an amplitude v1 (FIG. 5) and a signal 112 having an amplitude v2 (FIG. 5) are also simultaneously input. The 3-level comparator 51 outputs a signal 113 denoting whether or not the amplitude of the signal 102 is smaller than the amplitude v1 of the signal 111 and larger than the amplitude v2 of the signal 112 by, for example, a high or low level state. In a latch circuit 52, the signal 113 is latched in synchronization with the clock signal 101 and output as a signal 104.

As described above, in this embodiment, by the above-mentioned constitution, the reproduced binary baseband PCM signal is once equalized to be free from intersymbol interference. Accordingly, a stabilized clock signal can be easily reproduced using an ordinary PLL equipped with a phase comparator for comparing a phase of the once equalized PCM signal at a zero-cross point there with a reference clock phase. Moreover, as a result of the partial response equalization, signal detection can be performed at a low bit error rate.

Next, the second embodiment of the present invention is explained.

Figure 7:
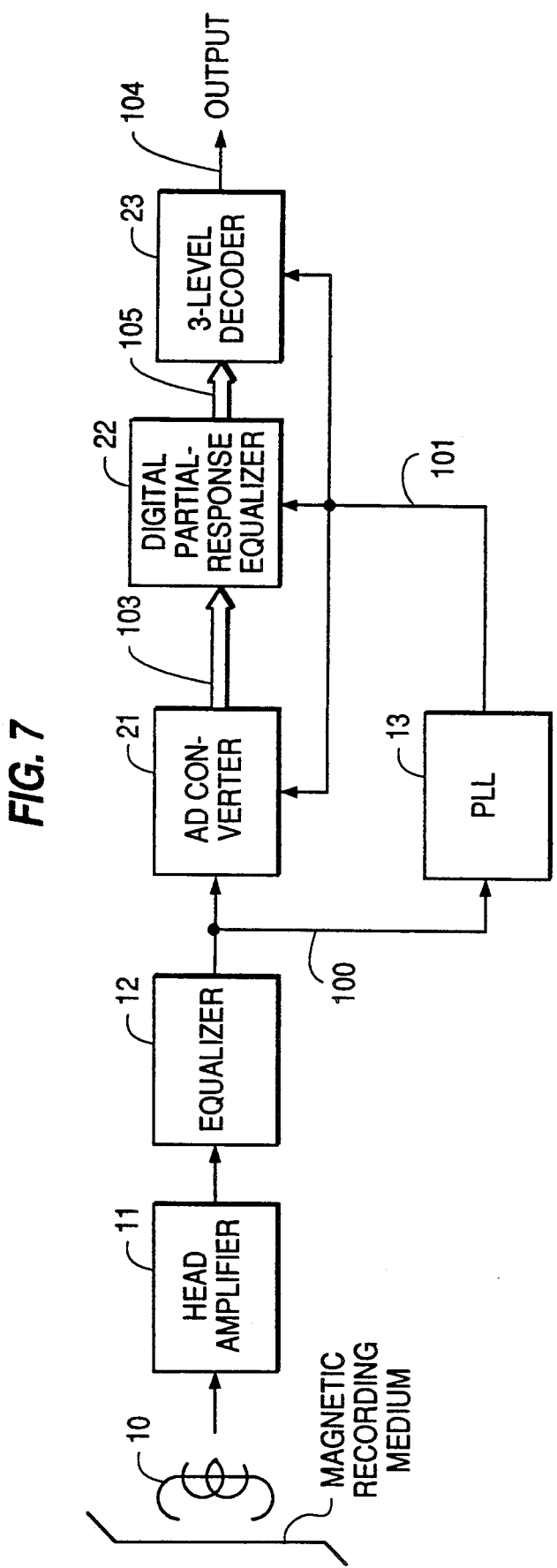
FIG. 7 is a block diagram of a second embodiment of a signal detection apparatus of the present invention.

FIG. 7 is a block diagram of the second embodiment in which a signal detection apparatus of the present invention is applied to a magnetic recording and reproducing apparatus. In FIG. 7, the same reference numbers as those shown in FIG. 1 are assigned to the components having the same configuration and function as the first embodiment. Only those operations which are distinct from the operations of the first embodiment are explained below.

In FIG. 7, the signal 100, which has been equalized by the equalizer 12 to reduce the intersymbol interference formed during the recording and reproducing process, is input to an AD converter 21. The AD converter 21 samples and quantizes the signal 100 in synchronism with the clock signal 101 which is synchronized with the digital information. The output signal 103 of the AD converter 21 is equalized by a digital partial response equalizer 22 so that the intersymbol interference becomes (1, 0, −1) in the form of a digital signal.

Figure 8:
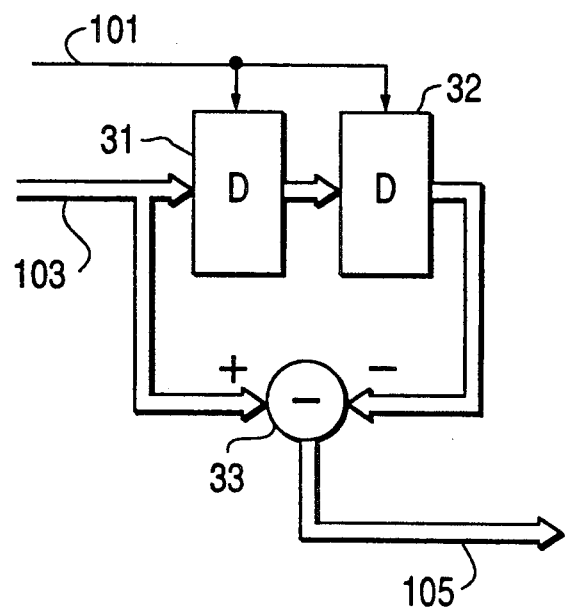
FIG. 8 is a block diagram of a digital partial response equalizer in the second embodiment.

A configuration of the digital partial response equalizer 22 is shown in FIG. 8. The digital partial response equalizer 22 is constituted by serial connected delay circuits 31, 32 which each delay the signal 103 by 1 clock period in response to the clock signal 101, and a subtraction circuit 33 which subtracts the output signal of the delay circuit 32 from the signal 103. That is, the digital partial response equalizer 22 is a digital filter in which the impulse response is (1, 0, −1). It is apparent that the thus equalized signal 105 becomes a signal having an equal value relative to the signal expressed by the 3-level eye pattern shown in FIG. 5, in the same manner as the embodiment shown in FIG. 1.

Referring again to FIG. 7, the equalized signal 105 is decoded by a 3-level decoder 23 into the original digital information, which is output as a signal 104. The 3-level decoder 23 carries out the function of the 3-level decoder 15 of the first embodiment as shown in FIG. 6 in the form of a digital signal, and since its configuration is apparent, an explanation thereof is omitted.

As described above, the second embodiment is characterized in that the partial response equalization can be accurately carried out using a digital filter, in addition to realizing effects similar to those of the first embodiment.

Next, the third embodiment of the present invention is explained.

Figure 9:
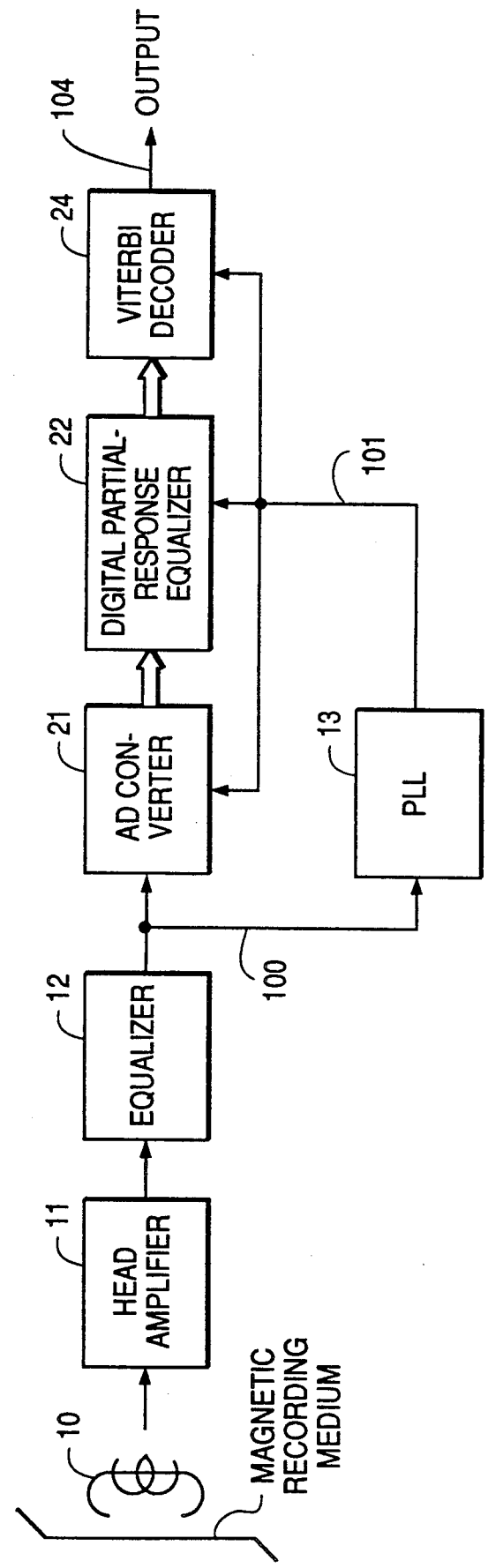
FIG. 9 is a block diagram of a third embodiment of a signal detection apparatus of the present invention.

FIG. 9 is a block diagram of the third embodiment in which a signal detection apparatus is applied to a magnetic recording and reproducing apparatus. In FIG. 9, the same reference numbers as shown in FIG. 7 are assigned to components having the same configuration and function as the embodiment shown in FIG. 7.

The embodiment of FIG. 9 differs from the embodiment of FIG. 7 in that a Viterbi decoder 24 is used in place of the 3-level decoder 22, and the digital information is detected by maximum-likelihood decoding. The configuration and operation of the Viterbi decoder 24 are well known as described in C. Yamamitsu et al., "An Experimental Study on Bit Rate Reduction and High Density Recording for a Home-use Digital VTR", IEEE Transactions on Consumer Electronics, Vol. 34, No. 3, August 1988, pp. 588–596, and thus, a detailed explanation thereof is omitted here.

This third embodiment exhibits excellent characteristics in that, in addition to the effects achieved in the second embodiment, the digital information can be detected at an even lower bit error rate as a result of the maximum-likelihood decoding.

In the above-mentioned embodiments, the present invention is applied to a magnetic recording and reproducing apparatus. However, the present invention is not so limited and is also applicable to the detection of digital information transmitted on a communication transmission channel and the detection of digital information generated from other types of recording mediums.

In the above-mentioned embodiment, partial response equalization is performed to make the intersymbol interference (1, 0, −1), but the present invention is not so limited and is applicable to the partial response equalization of optional intersymbol interference according to the characteristic of the transmission channel or the recording medium or according to restrictions of the circuit scale.

Further, in the first and second embodiments a multi-value level decoder is used, and in the third embodiment a Viterbi decoder is used, for decoding. However, the decoding technique is not so limited, and other decoding techniques, such as sequential decoding, may be used as needed.

What is claimed is:

1. A signal detection apparatus for detecting digital information from a PCM signal, comprising:
   a first equalization means for equalizing a binary baseband PCM signal transmitted through a transmission channel or reproduced from a recording medium to reduce the intersymbol interference;
   a clock reproducing means for reproducing a clock signal from an output signal of said first equalization means, said clock reproducing means comprising a phase locked loop circuit having a phase comparator for comparing a phase of the output signal of said first equalization means at a zero-cross point thereof with a reference clock phase;
   a second equalization means for subjecting the output signal of said first equalization means to partial response equalization; and
   a decoding means for decoding digital information from an output signal of said second equalization means in response to the clock signal reproduced by said clock reproducing means.

2. A signal detection apparatus for detecting digital information from a PCM signal, comprising:
   a first equalization means for equalizing a binary baseband PCM signal transmitted through a transmission channel or reproduced from a recording medium;
   a clock means for reproducing a clock signal from an output signal of said first equalization means, said clock reproducing means comprising a phase locked loop circuit having a phase comparator for comparing a phase of the output signal of said first equalization means at a zero-cross point thereof with a reference clock phase;
   an analog-to-digital conversion means for sampling and quantizing the output signal of said first equalization means in response to said clock signal;
   a digital equalization means for subjecting a digital output signal of said analog-to-digital conversion means to partial response equalization; and
   a decoding means for decoding digital information from an output signal of said digital equalization means.

3. A signal detection apparatus according to claim 2, wherein said decoding means comprises a Viterbi decoder.

* * * * *